(12) United States Patent
Zhou et al.

(10) Patent No.: US 8,902,751 B1
(45) Date of Patent: Dec. 2, 2014

(54) MULTI-STAGE SWITCHING TOPOLOGY

(75) Inventors: Junlan Zhou, Sunnyvale, CA (US);
Amin Vahdat, Los Altos, CA (US);
Arjun Singh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 207 days.

(21) Appl. No.: 13/358,898

(22) Filed: Jan. 26, 2012

(51) Int. Cl.
*H04L 12/28* (2006.01)
*H04L 12/46* (2006.01)

(52) U.S. Cl.
USPC ............................ 370/235; 370/255; 370/389

(58) Field of Classification Search
USPC ......................................... 370/229, 255, 477
See application file for complete search history.

(56) References Cited

U.S. PATENT DOCUMENTS

| | | | | |
|---|---|---|---|---|
| 6,643,702 B1 * | 11/2003 | Yeung | ........................... | 709/238 |
| 8,737,269 B1 * | 5/2014 | Zhou et al. | ..................... | 370/255 |
| 2007/0025327 A1 * | 2/2007 | Raciborski et al. | ........... | 370/351 |
| 2012/0072602 A1 * | 3/2012 | Marr et al. | ..................... | 709/228 |
| 2012/0250679 A1 * | 10/2012 | Judge et al. | ..................... | 370/359 |

* cited by examiner

*Primary Examiner* — Donald Mills
*Assistant Examiner* — Henry Baron
(74) *Attorney, Agent, or Firm* — Lerner, David, Littenberg, Krumholz & Mentlik, LLP (57) ABSTRACT

A system and method provides for delivering substantially uniform performance to all hosts in a network while minimizing a total number of switches required to deliver that performance. In a multi-stage network having a plurality of switches in a first tier and a plurality of switches in a second tier, additional switches may be deployed in the second tier to alleviate problems occurring as a result of uneven striping. A minimum number of second tier switches to be deployed may be determined as a function of a target level of throughput, for example, when using WCMP flow distribution.

15 Claims, 8 Drawing Sheets

MULTI-STAGE SWITCHING TOPOLOGY

BACKGROUND OF THE INVENTION

Multi-stage networks typically have multiple paths between each source, destination pair. Hence, each switch in the network may have multiple viable egress ports (leading to multiple next-hop switches) to reach the eventual destination. Typically such next hops are treated with the same cost, i.e. traffic is distributed evenly among all the egress ports. In particular, packets grouped according to a certain set of characteristics called flows (e.g. same source/destination Internet Protocol (IP) address, source/destination transport protocol port, and protocol type) are sent along the same path. However, different flows are distributed among the multiple ports using a hash function that maps a given flow to a given egress port. When flows are distributed evenly among all viable ports, it is called Equal Cost Multi Path (ECMP) flow distribution.

SUMMARY OF THE INVENTION

One aspect of the technology provides a method of increasing throughput in a multi-tier network comprising a number of first tier switches and a number of second tier switches linked to the first tier switches. The method may comprise computing, using a processor, a percentage of throughput associated with increasing the number of first tier switches by a predetermined number and increasing the number of second tier switches by a proportional number, determining, based on the computed percentages of throughput, the number of first tier switches to be deployed in the multi-tier network, and deploying the determined number of first tier switches in the multi-tier network. Moreover, a target throughput may be selected, and based on the number of first tier switches to be deployed and the target throughput, a minimum number of required second tier switches may be determined. The first tier switches may be linked to the second tier switches once deployed, and a forwarding table may be configured in each deployed first tier switch to distribute flows to the deployed second tier switches based on a number of links between a given first tier switch and at least one of the deployed second tier switches.

Another aspect of the technology provides a method of configuring a multi-tier network, comprising computing, using a processor, a percentage of throughput associated with deploying a first number of first tier switches and a corresponding number of second tier switches, wherein the first number is within a predetermined range and the computing is performed across the predetermined range, selecting a threshold throughput, calculating, for each number of first tier switches in the predetermined range, a minimum number of second tier switches required to guarantee a throughput at or above the threshold throughput, and determining, based on the computed percentages of throughput and the calculated minimum numbers of required second tier switches, the number of first tier switches and the number of second tier switches to be deployed in the multi-tier network. Further, an additional number of second tier switches may be deployed, wherein the additional number is higher than the calculated minimum required number of second tier switches for the number of first tier switches to be deployed in the network, and lower than the minimum required number of second tier switches for a next higher number of first tier switches.

Yet another aspect of the technology provides a method of configuring a multi-stage network, comprising deploying a first number of first tier switches, deploying a second number of second tier switches, linking the first tier switches to the second tier switches, and programming the first tier switches to distribute flows to the second tier switches using weighted cost multi-path distribution. The second number of second tier switches may be greater than or equal to the first number of first tier switches and provides for a target level of throughput of the flows. According to one example, the first number of first tier switches and the second number of second tier switches may be determined by computing, using a processor, for each value in a range of values corresponding to a potential number of first tier switches, a percentage of throughput associated with that value and a corresponding number of potential second tier switches, selecting a threshold throughput, calculating, for each value in the range of values, a minimum number of second tier switches required to guarantee a throughput at or above the threshold throughput, and selecting the first number of first tier switches and the second number of second tier switches based on the computed percentages of throughput and the calculated minimum number of required second tier switches.

Another aspect of the technology provides a multi-stage network, comprising a first number of first tier switches, each of the first tier switches comprising a plurality of uplink ports and being programmed to distribute flows through the uplink ports using weighted cost multi-path distribution, a second number of second tier switches, wherein the second number of second tier switches is greater than or equal to the first number of first tier switches and provides for a target level of throughput of the flows, and a plurality of links between the first tier switches and the second tier switches, wherein a link is coupled to each of the plurality of uplink ports of each of the first tier switches. Each of the first number of first tier switches may comprise a forwarding table, wherein the forwarding table in each first tier switch is programmed to distribute flows to the second tier switches based on a number of links between a given first tier switch and at least one of the second tier switches. Moreover, the second number of second tier switches may further provide for the target level of throughput in the event that at least one second tier switch is not functioning.

DETAILED DESCRIPTION

The present technology provides systems and methods for delivering substantially uniform performance to all hosts in a network while minimizing a total number of switches required to deliver that performance. For example, in a multi-stage network having a plurality of switches in a first tier and a plurality of switches in a second tier, additional switches may be deployed in the second tier to alleviate problems occurring as a result of uneven striping. Uneven striping occurs when a first stage device includes more links to one second stage device than to another. For example, the first stage device may include a limited number of uplink ports which does not evenly divide into the number of second stage devices, but it is desirable to fully utilize all of the first stage device's uplink ports. Weighted cost multi-path (WCMP) flow distribution may also alleviate such problems. A minimum number of second tier switches to be deployed may be determined as a function of a target level of throughput, for example, when using WCMP flow distribution. Building and maintaining the network using the minimum number of second tier switches may reduce costs while improving network performance.

Figure 1:
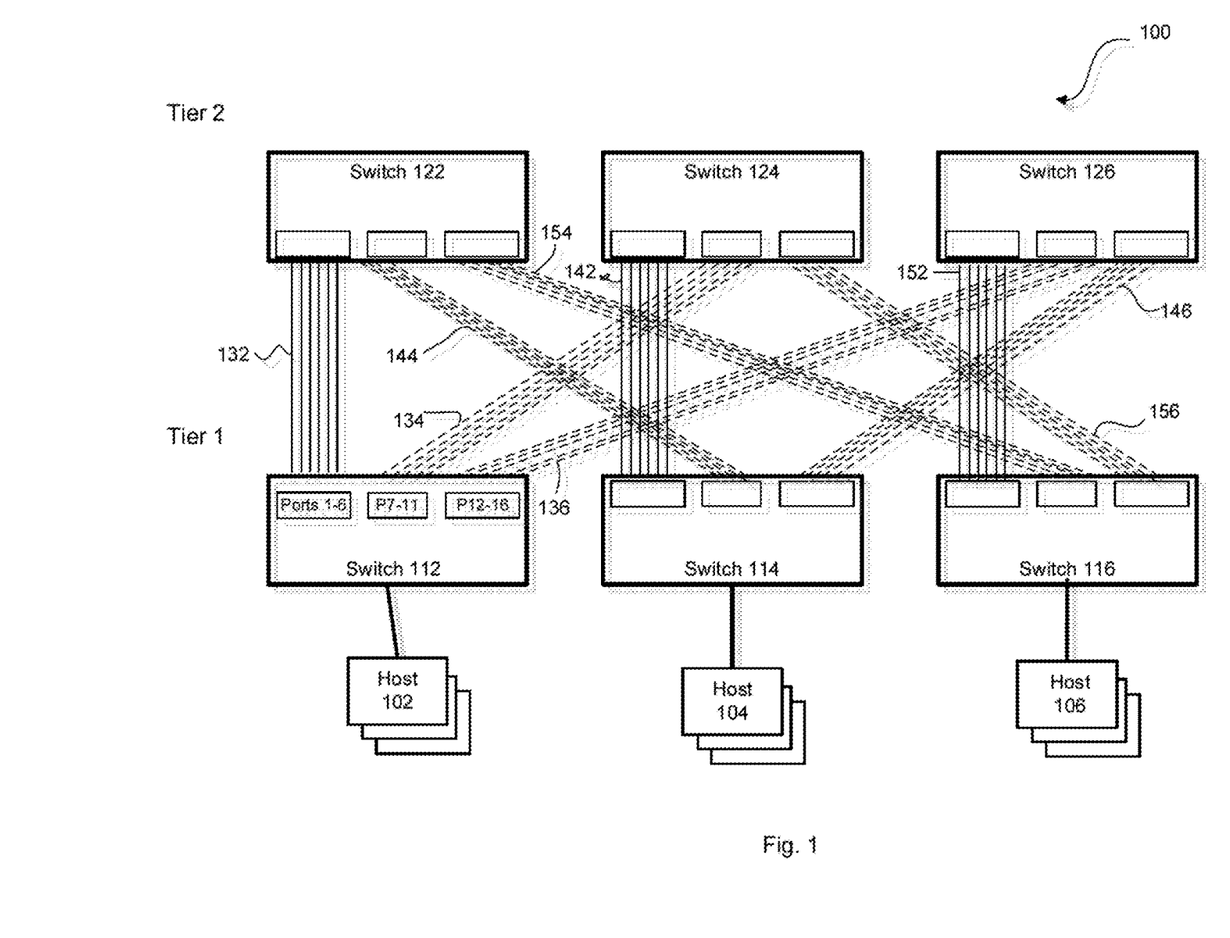
FIG. 1 is a schematic diagram of a multi-stage network according to aspects of the technology.

FIG. 1 illustrates a multi-stage network 100 according to aspects of the technology. As shown, the network comprises a first stage (Tier 1) including a first plurality of switches 112, 114, 116, and a second stage (Tier 2) including a second plurality of switches 122, 124, 126. While only a few switches 112-116, 122-126 are shown, it should be understood that the network 100 may be expanded to include any number of switches, for example, to accommodate greater amounts of network traffic. Each of the Tier 1 switches 112-116 may be coupled to one or more host devices 102, 104, 106, such as network servers or other computing devices. Each Tier 1 switch 112-116 may further be coupled to one or more of the Tier 2 switches 122-126. For example, each Tier 1 switch 112-116 may be coupled to each Tier 2 switch 122-126.

Each switch 112-116 and 122-126 may include a predetermined number of data ports. The number of data ports may vary depending on, for example, a type of switch used and may be proportional to a cost of the switch. Some ports may be dedicated to downlink traffic (e.g., from Tier 2 switches to Tier 1 switches, or from Tier 1 switches to host devices), while others may be dedicated to uplink traffic (e.g., from Tier 1 switches to Tier 2 switches, or from Tier 2 switches to other network devices). Alternatively or additionally, some ports may be dedicated to ingress while others are dedicated to egress. The number of data ports may also dictate the number of links that may be established with other network devices. For example, Tier 1 switch 112 may have 16 data ports for uplink traffic, and thus 16 links may be established between the switch 112 and the Tier 2 switches 122-126. Because there are three Tier 2 switches 122-126, and because 16 does not divide equally by 3, there may be an uneven distribution of links among the switches 122-126 (e.g., uneven striping). For example, the connection 132 between the switch 112 and the switch 122 may comprise 6 links (e.g., coupled to ports 1-6 of the switch 112), while the connections 134, 136 between the switch 112 and each of the switches 124, 126 may comprise 5 links (e.g., coupled to ports 7-11 and ports 12-16, respectively, of the switch 112). While using ECMP flow distribution in such an environment with uneven striping may cause problems (e.g., oversubscription), weighting the flows using WCMP flow distribution may provide improved load balancing.

Figure 2:
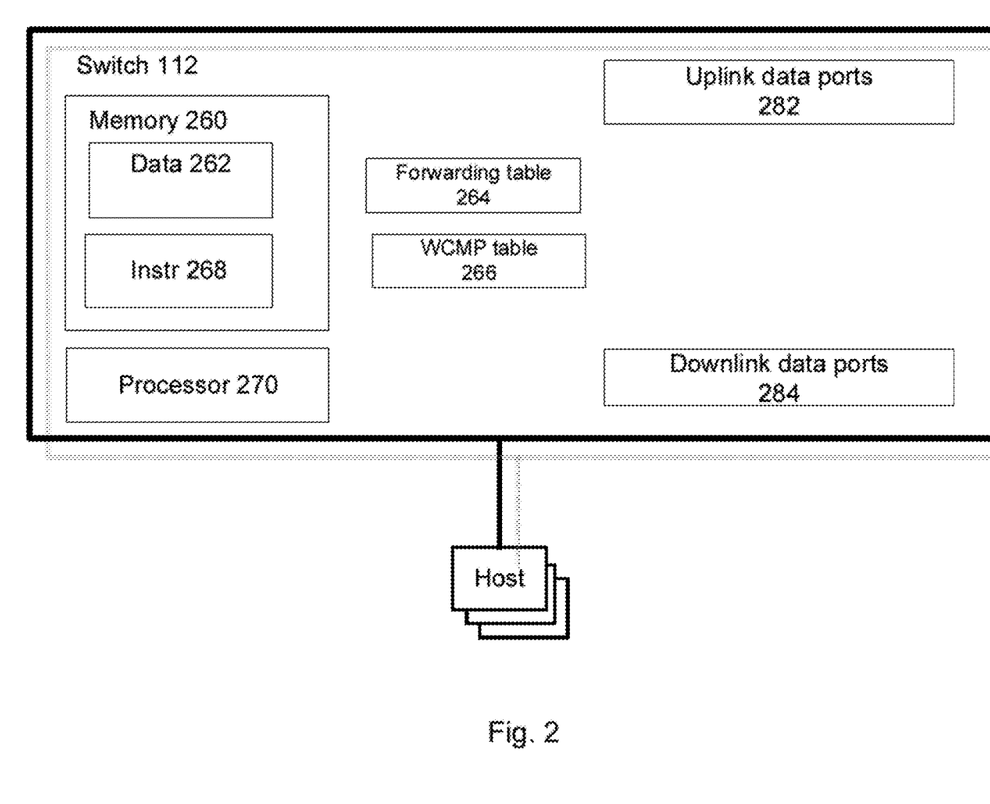
FIG. 2 is a block diagram of a switch according to aspects of the technology.

The Tier 1 switches 112-116 and the Tier 2 switches 122-126 may be routers, chips, or any other type of device capable of receiving packets at a first port and transmitting the packets through a second port. FIG. 2 illustrates an example of a switch, such as the switch 112. The switch 112 may comprise a memory 260, including data 262 and instructions 268, and a processor 270 coupled to the memory 260. The switch 112 may further comprise a number of data ports, such as uplink data ports 282 and downlink data ports 281.

The switch 112 may also include one or more forwarding tables 264 and WCMP tables 266. For example, the forwarding tables 264 may include a number of entries, each listing a key and an action. As packets are received by the switch 112, header information in those packets may be matched against the keys of the forwarding table to determine a corresponding action (e.g., a next hop). The WCMP table may, for example, include a weighting of each of the uplink data ports 282 on the switch 112, and may be used to determine which port (e.g., which uplink data port 282) the packet should be transmitted through. While the forwarding table 264 and WCMP table 266 are shown as being stored separately from the memory 260, it should be understood that the forwarding table 264, WCMP table 266, data 262, and instructions 268 may all be stored in the same medium.

The memory 260 stores information accessible by processor 270, including instructions 268, and data 262 that may be executed or otherwise used by the processor 270. The memory 260 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 268 may be any set of instructions to be executed directly (such as machine code) or indirectly (such as scripts) by the processor 270. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 262 may be retrieved, stored or modified by processor 270 in accordance with the instructions 268. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 270 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

While the components of the switch 112 have been described with respect to a particular Tier 1 switch, it should be understood that a similar architecture may be imparted to any of the other Tier 1 switches of any of the Tier 2 switches. According to one aspect, while the same switches may be used for Tier 1 and Tier 2, these switches may be configured differently. According to another aspect, the Tier 2 switches may differ from the Tier 1 switches, for example, with respect to the included number of data ports.

Figure 3:
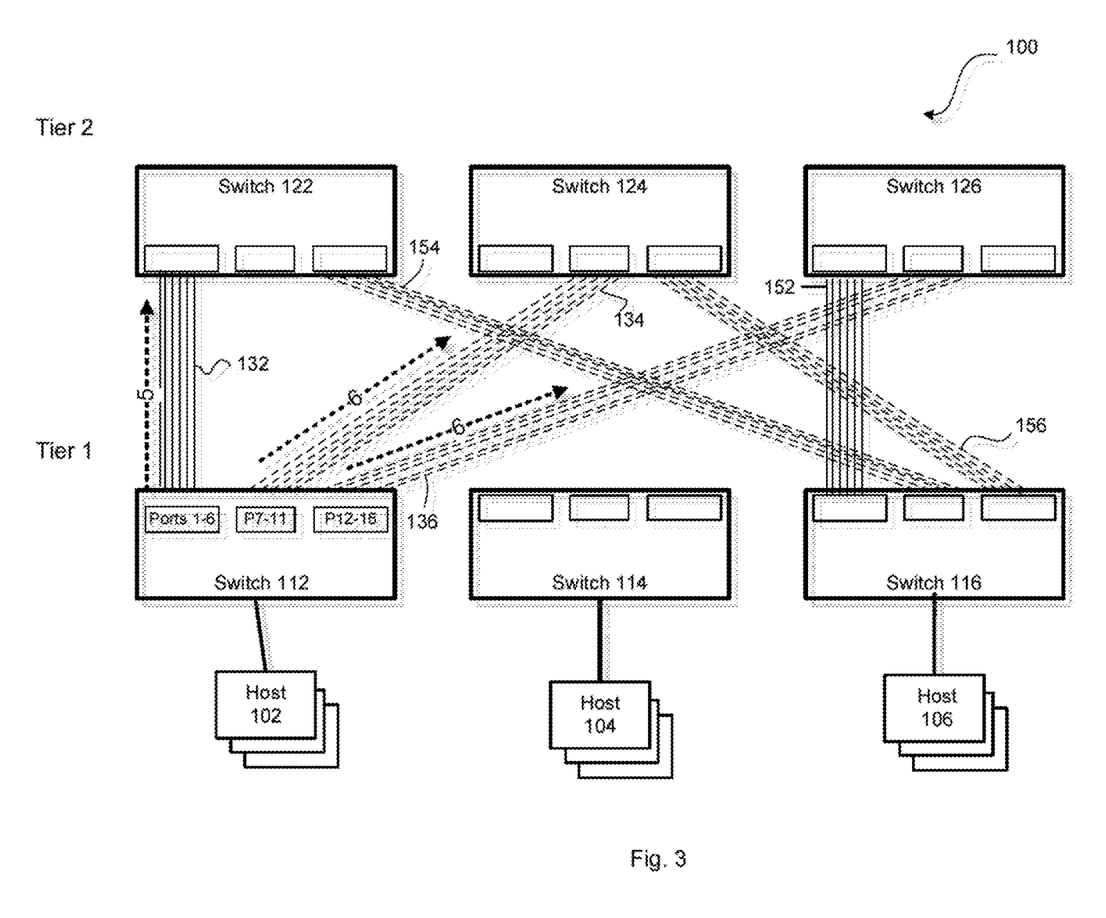
FIG. 3 is an illustration of an example of flow distribution according to aspects of the technology.

FIG. 3 illustrates an example of WCMP flow distribution according to aspects of the technology. As explained above with respect to FIG. 1, the connection 132 between the switch 112 and the switch 122 may comprise 6 links (e.g., in a bundle), while the connections 134 and 136 from the switch 112 to the switches 124 and 126, respectively, may each comprise 5 links. Similarly, the connection 152 between the switch 116 and the switch 126 may comprise 6 links, while the connections 154 and 156 to the switches 122 and 124 may each comprise 5 links. This may cause congestion in an ECMP flow distribution, because, for example, uplink traffic from the switch 112 to the switch 122 may be transmitted at a higher bandwidth than the downlink traffic from the switch 122 to the switch 116. However, using WCMP flow distribution ameliorates this problem.

As shown, the connection 132 may be given a weight of 5, while the connections 134 and 136 are each given a weight of 6. Thus, for example, for each 5 flows transmitted over each of the links in connection 132, 6 flows are transmitted over each of the links in connection 134 and 6 flows are transmitted over each of the links in connection 136. In this regard, the Tier 2 switch 122 will not become oversubscribed, and therefore is less likely to drop packets.

Figure 4:
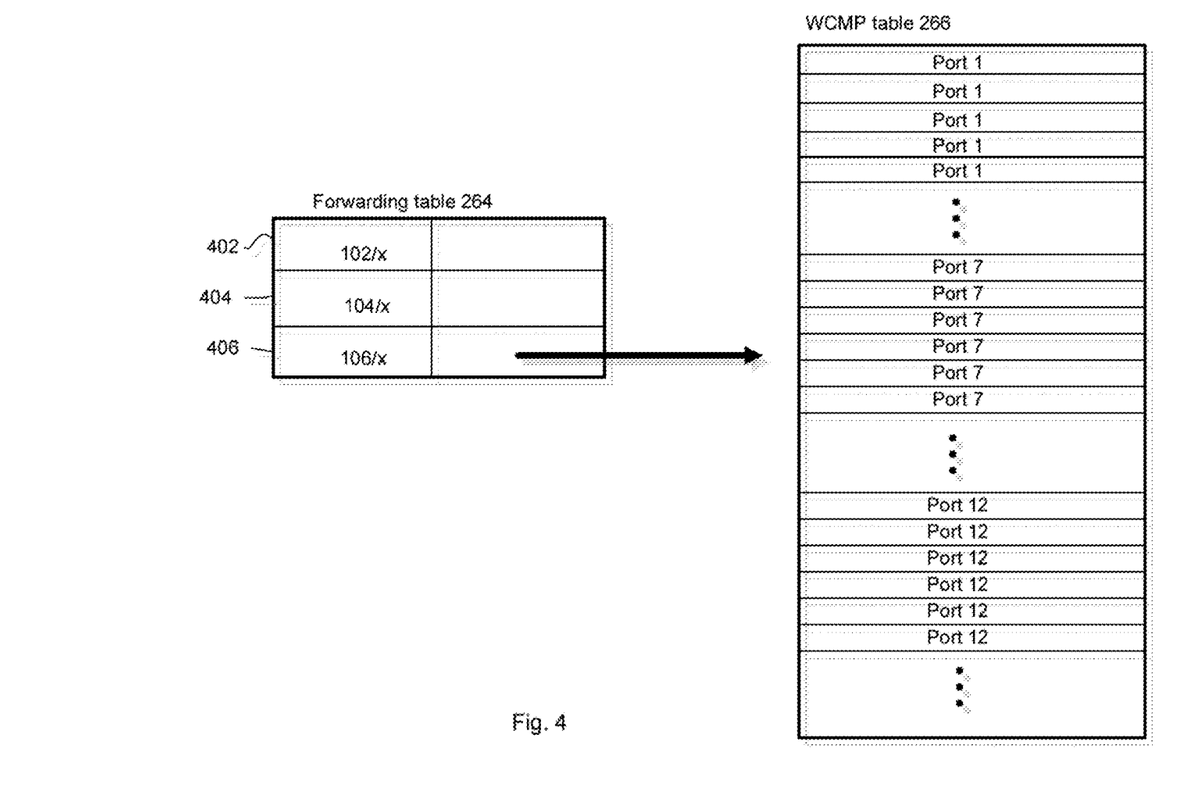
FIG. 4 is an example of switch tables according to aspects of the technology.

The weighting of the flows may be managed, for example, using the forwarding table 264 and the WCMP table 266. FIG. 4 illustrates an example of the forwarding table 264 and the WCMP table 266. The forwarding table 264 may include a number of entries 402, 404, 406, each entry having a key and an action. The key may comprise a number of bits representing, for example, a destination address. The action may comprise information representing a next hop for packets received matching the key. The WCMP table 266 may include a plurality of entries, with each entry identifying a port of the switch 112 through which received packets may be forwarded. The number of entries listing a particular port may vary depending on a weight assigned to that port. For example, the links in the connection 132 coupled to ports 1-6 of the switch 112 are assigned a weight of five, as discussed above in connection with FIG. 3. Accordingly, each of ports 1-6 may have five entries in the WCMP table 266. Similarly, the five links in the connection 134 coupled to the ports 7-11 of the switch 112 were assigned a weight of 6. Therefore, each of the ports 7-11 may have 6 corresponding entries in the WCMP table 266.

While the foregoing description of FIG. 4 provides one example in which weighting of flows is achieved, it should be understood that any hardware provided weighting scheme may alternatively or additionally be used. For example, the hardware may be able to take a weight along with each port and implement a hash algorithm such that particular ports may be picked more often than others based on their weight.

An example of WCMP distributed traffic is now described with respect to FIGS. 3-4. In this example, the host 102 serves as a source for transmitting data to the host 106, which serves as a destination. The traffic is received at the switch 112 for delivery to the switch 116 through one or more of the Tier 2 switches 122-126. Because each of the switches 122-126 are linked to both the switch 112 and the switch 116, the traffic may be distributed among the Tier 2 switches 122-126 for increased efficiency. To avoid congestion of a particular Tier 2 switch (e.g., the switch 122), the distribution may be weighted. For example, the traffic may be weighted in relation to the number of links between the switch 112 and each Tier 2 switch 122-126, and/or in relation to the number of links between a given Tier 2 switch and the switch 116. For example, each link in connection 132 may be assigned a weight of 5, while each link in connections 134 and 136 may be assigned a weight of 6. Therefore, for each 5 flows distributed through a link of the connection 132, 6 flows may be distributed through links of the connections 134, 136. In this regard, each of the switches 122-126 may be able to transmit the received portion of the traffic through the connections 152-156 to the switch 166 for delivery to the destination host 106.

The distribution may be executed by the switch 112 using, for example, a hash function. For example, the hash function may output a random number. An algorithm may correlate the random number modulo a number of ports in the switch 112 to a given port of the switch 112 or to its corresponding link. For example, if the hash function outputs a mod 0, the flow may be sent through port 1, whereas if the hash function outputs a mod 1 or mod 2, the flow may be sent through port 7. This is only one example of how a random input from a packet header may be mapped to a given port of the switch, and various other implementations may be used.

The ratios of flows distributed over each link (e.g., connections 132-136) may be determined based on, for example, throughput, the number of links between Tier 1 and Tier 2, capacity of the Tier 2 switches, capacity of the Tier 1 switch forwarding tables, etc. For example, a distribution that improves the maximum traffic throughput without any packet loss may be derived using the following equation:

$$W\_r\_s\_i = \min(N\_s\_i, N\_r\_i)/N\_s\_i,$$

In this equation, $W\_r\_s\_i$ is the weight of each link from Tier 1 switch r to Tier_2 switch i, for traffic from a source switch s to the remote Tier 1 switch r. $N\_s\_i$ is the total number of links between Tier 1 switch s to Tier 2 switch i. $N\_r\_i$ is the total number of links between Tier 1 switch r to Tier 2 switch i. For example, referring to FIG. 1, the Tier 1 switch s may be the switch 112; Tier 2 switch i may be the switch 122; Tier 1 switch r may be the switch 116. Thus, $N\_s\_i=6$, and $N\_r\_i=5$. Plugging these values into the equation, $W\_r\_s\_i=\min(6,5)/6=5/6$. Thus, 5/6 of the bandwidth of the connection between the switch 112 and the Tier 2 switch 122 may be used when transmitting flows to the remote switch 116.

According to some aspects, multiple considerations may be balanced. For example, considerations of high throughput and reduced consumption of resources in the forwarding tables may be balanced to achieve a weight distribution that satisfies both considerations.

Figure 5:
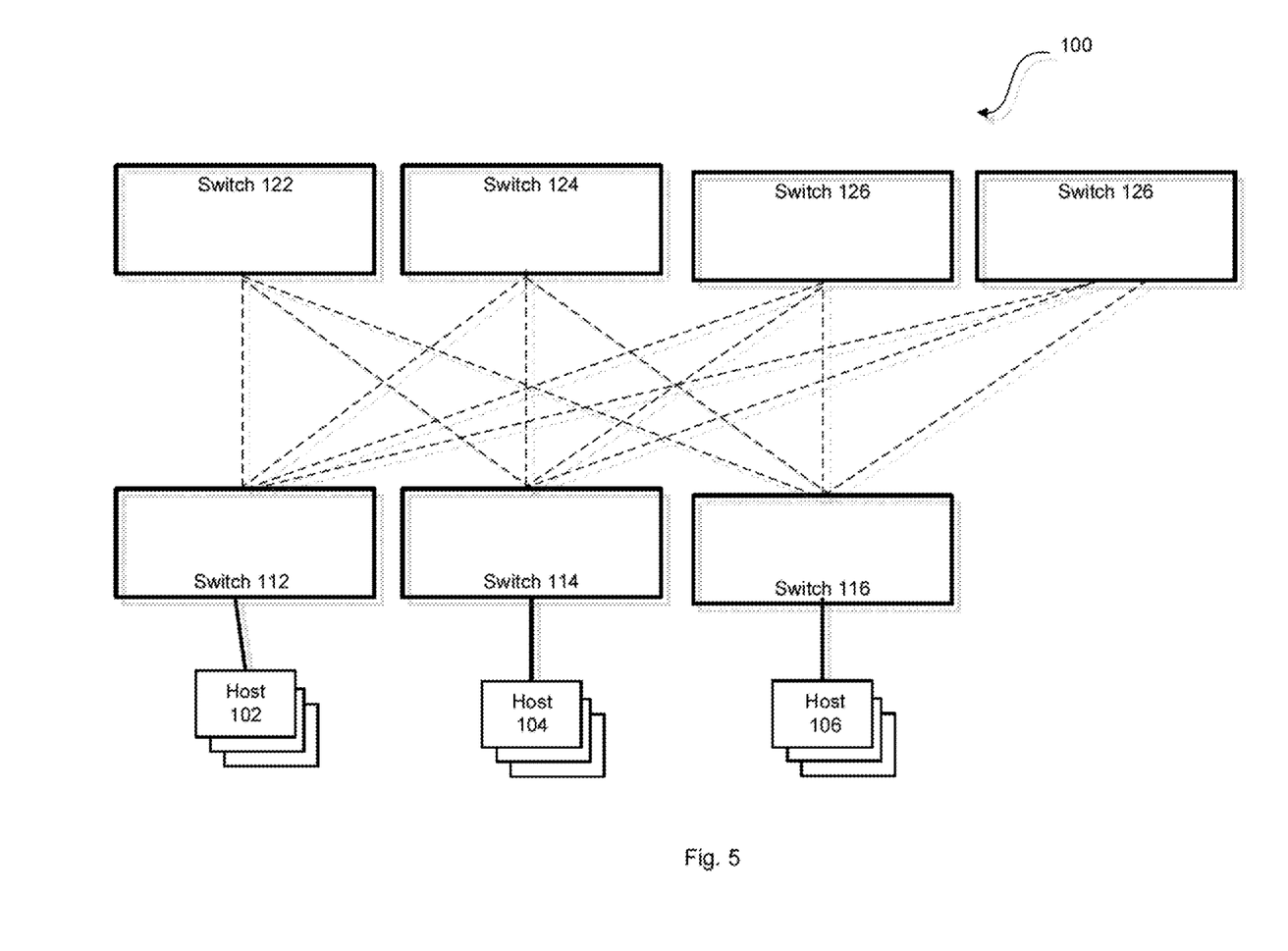
FIG. 5 is an example of overbuilding a higher tier of a network according to aspects of the technology.

FIG. 5 illustrates an example of overbuilding the second tier of the network in order to improve throughput. For example, switch 128 may be added to Tier 2 of the network and linked to each of the switches 112-116 in Tier 1. The uplinks from the Tier 1 switches 112-116 may thus be redistributed across each of the Tier 2 switches 122-128. Because the switches 112-116 each have 16 uplink ports, links may be evenly distributed to the four Tier 2 switches 122-128 (e.g., four uplinks to each Tier 2 switch 122-128). In this regard, even striping may result from the addition of the Tier 2 switch 128, and throughput may increase to approximately 100%. Because each of the Tier 2 switches 122-128 may have 16 downlink ports (e.g., for connectivity as described in FIG. 3), some of these downlink ports may be left unconnected when Tier 2 is overbuilt as described in FIG. 5. However, this underutilization of resources may be outweighed by the benefits of increased throughput. According to one aspect, different types (e.g., lower cost, fewer downlink ports) switches may be deployed in Tier 2.

A degree of overbuilding of Tier 2 may be determined based on one or more factors, such as cost, throughput, the number of uplink ports in each Tier 1 switch, the number of downlink ports in each Tier 2 switch, the number of Tier 1 switches deployed, or any combination of these or other factors. For example, the number of Tier 2 switches (K) to be deployed may be within a range: $D \leq K \leq Ceil(N*L/D)$, where D is the number of downlinks for each Tier 2 switch, L is the number of Tier 1 switches deployed, and N is the number of uplinks of Tier 1 switches. While, for a given number of Tier 1 switches L, deploying the maximum number of Tier 2 switches (Ceil(N/Floor(N/L))) may deliver 100% throughput, it may also be the most expensive technique. Conversely, deploying the minimum number of Tier 2 switches (L) may be the cheapest technique, but may deliver unacceptable bandwidth.

To balance cost and bandwidth, bandwidth may be expressed as a function of L and K. Each Tier 1 switch (e.g., switches 112-116 of FIG. 3) may be connected to a Tier 2 switch via either p links or (p+1) links (e.g., 6 links in connection 132 of FIG. 3 or 5 links in connections 134, 136 of FIG. 3). Thus, p=Floor(N/K). M may represent a number of Tier 2 switches with more links to a given Tier 1 switch. Accordingly, M Tier 2 switches may have p+1 links to a given Tier 1 switch (hereinafter "good" Tier 2 switches for the given Tier 1 switch), and K−M Tier 2 switches may have p links to the given Tier 1 switch (hereinafter "bad" Tier 2 switches for the given Tier 1 switch). A total number of links from Tier 2 switches to a given Tier 1 switch may be represented by the following equation:

$$Links\_to\_Tier1\_switch=(K-M)*p+M*(p+1)=K*p+M=N$$

For a given sender and receiver Tier 1 switch pair, M_o may be the number of oversubscribed Tier 2 switches (e.g., Tier 2 switches having more links to the sender Tier 1 switch than the receiver Tier 1 switch; p+1 links from sender to Tier 2 switch, as compared to p links from Tier 2 switch to receiver). M_o may be expressed as a function of "good" and "bad" Tier 2 switches:

$$M\_o=Min(M,K-M)$$

For any sender/receiver pair of Tier 1 switches, over-subscribed Tier 2 switches may comprise an intersection between the "good" Tier 2 switches for the sender and "bad" Tier 2 switches for the receiver. Because there are only M "good" Tier 2 switches for the sender, and K−M "bad" Tier 2 switches for the receiver, in a worst case a number of oversubscribed Tier 2 switches may be represented as: min(M, K−M).

From the sender Tier 1 switch, there may be (p+1)*M_o links toward oversubscribed Tier 2 switches, and N−(p+1) *M_o links towards non-oversubscribed Tier 2 switches. To eliminate packet drops, if a sender Tier 1 switch sends 1 unit of traffic on a link to a non-oversubscribed Tier 1 switch, it must send p/(p+1) traffic on a link to an oversubscribed Tier 1 switch. Thus, total traffic (T) sent by the sender Tier 1 switch may be:

$$T=(p+1)*M\_o*(p/(p+1))+(N-(p+1)*M\_o)=N-M\_o$$

Because a capacity of any Tier 1 switch is N links worth of bandwidth, oversubscription may be represented as:

$$oversubscription=N/(N-M\_o)$$

Because p=Floor(N/K), it follows that:

$$N<=K*p+M$$

$$M>=N-K*p$$

But, M>=0. Thus, M=Max(0, N−K*p). Substituting p=Floor(N/K), we get:

$$M=Max(0,N-K*Floor(N/K)); \text{ and}$$

$$Oversubscription(L,K)=N/(N-M\_o).$$

The reciprocal of the oversubscription may indicate throughput. For example, if oversubscription=1.1, delivered throughput may be 1/1.1=90.1%.

Another aspect for determining a number of Tier 2 switches to be deployed is described below with respect to FIGS. 6-7.

Figure 6:
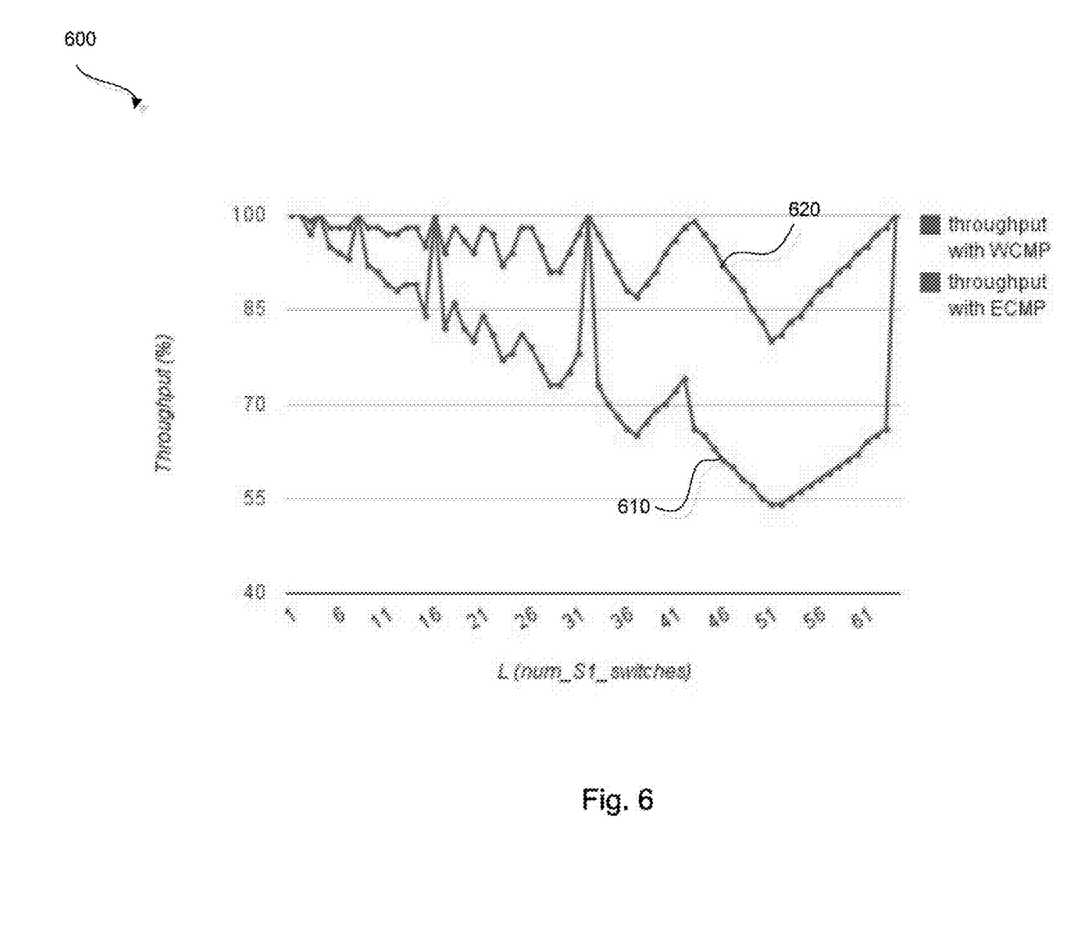
FIG. 6 is a graphical illustration of variations in throughput as a function of a number of switches deployed in a network according to aspects of the technology.

FIG. 6 is a graphical representation of an impact on throughput as a function of a number (L) of first tier switches deployed in the network. In this example, the number of second tier switches may be 4 times the number of first tier switches (e.g., 4L). As shown, throughput may be calculated for each possible number of Tier 1 switches and plotted on graph 600. For example, throughput may be calculated using the equation for oversubscription described above, and taking the reciprocal of the oversubscription. Moreover, throughput may be calculated based on different types of flow distribution techniques. For example, a first curve (ECMP curve 610) illustrates variations in throughput using ECMP distribution, while a second curve (WCMP curve 620) illustrates variations in throughput using WCMP distribution.

In general, the WCMP curve 620 may be higher on the graph 600 than the ECMP curve 610, because using WCMP flow distribution may generally result in higher throughput than WCMP flow distribution, as discussed above. At some points in the graph 600, the WCMP curve 620 and the ECMP curve 610 may both reach 100% throughput for a given number of Tier 1 switches. For example, where the number L of Tier 1 switches is a power of 2 (e.g., 2, 4, 8, 16, 32, etc.), the throughput using either WCMP or ECMP flow distribution may be 100%. The reason for this may be that when L=2^x (and thus the number of Tier 2 switches=4(2^x)), and where each Tier 1 switch includes 16 uplinks, perfect striping may occur.

Based on the graph 600, a number of Tier 1 switches to be deployed in a network (and a corresponding number of Tier 2 switches) may be determined. For example, it may be determined that where L=37, the throughput is only approximately 86%, but where L=42, the throughput is closer to 95%. According to one aspect, the determination may be made using an algorithm executed on a processor. For example, the algorithm may balance considerations of high throughput and economy (e.g., the number of Tier 1 switches) to select a particular number of Tier 1 switches to deploy.

Figure 7:
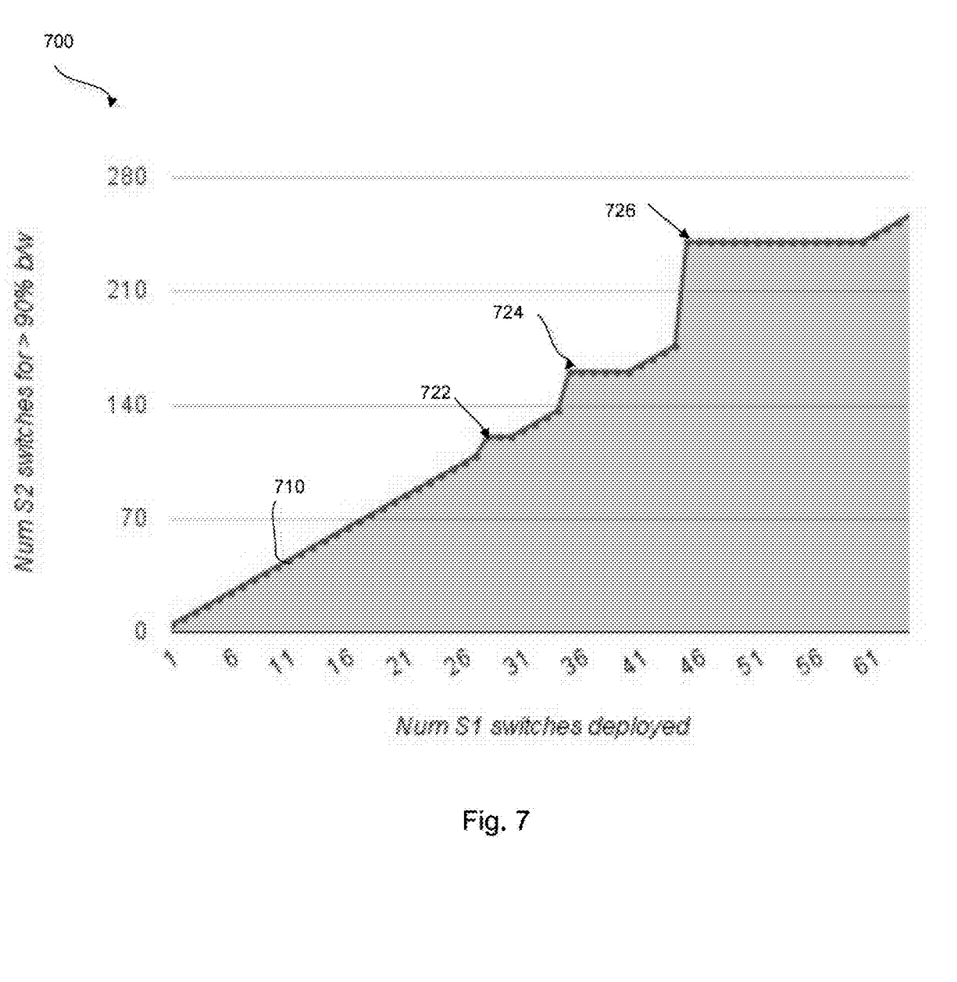
FIG. 7 is a graphical illustration of a minimum number of second tier switches required in a network according to aspects of the technology.

FIG. 7 is a graphical representation of a minimum number of second tier switches that may be deployed based on a number of first tier switches and a threshold throughput. According to the exemplary graph 700 of FIG. 7, the threshold throughput is set at 90%. A curve 710 may be derived from the points plotted for each number of Tier 1 switches. Where 0<L<28, the curve 710 rises steadily. For these points, the minimum number of Tier 2 switches is approximately 4L. However, at particular points 722, 724, 726 (corresponding to L=29, 36, 46), the curve 710 rises sharply. Such rises may indicate that the number of Tier 2 switches must be overdeployed in order to achieve 90% throughput. For example, looking at the difference between L=45 and L=46, a substantially greater number of Tier 2 switches is required for L=46.

The information from the graph 700, in addition or in the alternative to the information from the graph 600, may be used to determine the number of Tier 1 switches and Tier 2 switches to deploy in the network. For example, it may be most cost effective to select a number of Tier 1 switches just prior to one of the points 722, 724, 726, to avoid a need for a substantially higher number of Tier 2 switches. According to one aspect, this determination may also be made by a processor, for example, executing a given algorithm. According to a further aspect, the processor may be a network management server, and may configure the Tier 1 and Tier 2 switches in response to determining the number of switches to deploy.

In addition to the elements described above, methods according to aspects of the technology will now be described. While the methods may include various stages which are described below in a particular order, it should be understood that the sequence of the stages may be varied. In addition, stages may be omitted and/or additional stages may be added.

Figure 8:
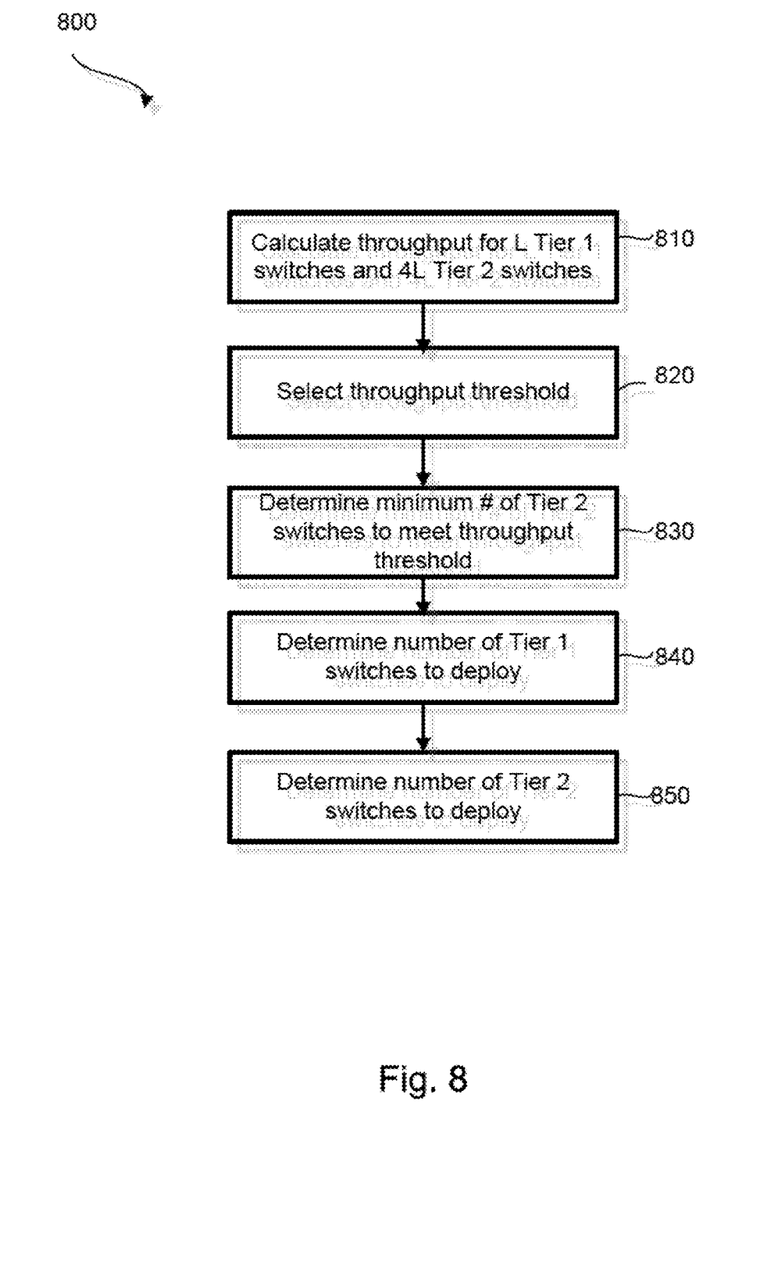
FIG. 8 is a flow diagram illustrating an example of a method for configuring a network according to aspects of the technology.

FIG. 8 is a flow diagram illustrating an example of a method 800 for configuring a multi-stage network. This method may be used, for example, in the initial setup of a network, in expanding or upgrading a network, or in maintaining a network. For example, if a given switch in the network fails, the network may be reconfigured to accommodate the failure (e.g., by updating the forwarding tables in the switches). Moreover, the method 800 may be used in any type of network, such as a data center switching fabric, a wide area network, a local area network, or a multi-core chip.

In block 810, throughput is calculated for a number (L) of Tier 1 switches and a corresponding number (e.g., 4L) of Tier 2 switches. The throughput may be calculated based on using WCMP flow distribution and/or ECMP flow distribution. The throughput may also be calculated for any number or range of values for 1. For example, referring back to FIG. 6, the throughput is calculated for a range of $1 \leq L \leq 64$. However, this range may be varied depending on a potential size or function of the network. Further, the corresponding number of Tier 2 switches (K) may be varied. For example, while in FIG. 6 the number of corresponding Tier 2 switches was set to 4L, and thus $4 \leq K \leq 256$, the value for K may be set to any number or range of numbers (e.g., 2L, L+n, etc.). According to one aspect, K may be selected such that a number of downlinks of Tier 2 switches is as close as possible to a number of ports of Tier 2 switches.

In block 820, a threshold throughput may be selected. The threshold may be selected based on, for example, target specifications for a network, switching standards, etc. According to one example, the threshold may be selected based on the calculated throughputs in block 810. For example, if for approximately half of the values in the range of L the throughput is above 92%, then 92% may be selected as the target throughput. The selection may be made by a human operator or by a processor (e.g., executing a given algorithm).

In block 830, a minimum number of Tier 2 switches required to be deployed to meet the threshold throughput may be determined. For example, the minimum number of Tier 2 switches may be calculated for each value of L used in block 810. According to one aspect, the calculated minimum number of Tier 2 switches may be plotted on a graph, such as the graph 700 of FIG. 7.

In block 840, a number of Tier 1 switches to deploy in the network may be determined. This determination may be based on, for example, the throughput calculated in block 810, the minimum number of required Tier 2 switches calculated in block 820, the specifications of the network, cost limitations, or any combination of these. The determination may be made by a human operator considering various factors, or by a processor which utilizes one or more of the various factors as input.

In block 850, a number of Tier 2 switches to deploy may be determined. For example, this determination may be based on the minimum number calculated in block 830. As a further example, one or more additional switches to the minimum number calculated in block 830 may be deployed, for example, to allow the threshold throughput to be maintained even in circumstances when one or more switches are down and/or being maintained.

While the examples above are described with respect to a two-stage network having only a few switches in each stage, it should be understood that the technology may be applied to a network having any number of switches in Tier 1 and Tier 2. Moreover, the technology may also be applied to expanded networks comprising additional stages (e.g., above, below, or in between Tier 1 and Tier 2).

The above-described aspects of the technology may be advantageous in providing load balancing of multi-stage switches. By reducing a number of oversubscribed switches, fewer packets may be dropped, and transmission of traffic comprising a plurality of packets may be completed faster. Moreover, the above-described aspects of the technology may be advantageous in providing effective use of resources in a multi-stage network. For example, throughput may be improved by increasing a number of higher tier switches. Additionally, this number of higher tier switches may be kept conservative by determining the minimum number required to achieve a target throughput. In this regard, hardware costs may be kept down. Even further, network maintenance may be simplified in some instances. For example, the methods described herein may be used to determine a degree of redundancy required.

Although the present invention has been described with reference to particular embodiments, it should be understood that these examples are merely illustrative of the principles and applications of the present invention. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative embodiments. However, these and that other arrangements may be devised without departing from the spirit and scope of the present invention as defined by the appended claims.

The invention claimed is:

1. A method of increasing throughput in a multi-tier network comprising a number of first tier switches and a number of second tier switches linked to the first tier switches, the method comprising:

computing, using a processor, a percentage of throughput associated with increasing the number of first tier switches by a predetermined number and increasing the number of second tier switches by a proportional number to the predetermined number;

selecting a target throughput;

determining, based on the computed percentages of throughput, the number of first tier switches to be deployed in the multi-tier network such that throughput in the multi-tier network is increased;

determining, based on at least the determined number of first tier switches to be deployed, a minimum number of required second tier switches to be deployed to achieve the target throughput;

deploying the determined number of first tier switches in the multi-tier network; wherein the first tier switches are adapted to perform weighted cost multi-path routing; and deploying at least the minimum number of required second tier switches.

2. The method of claim 1, further comprising deploying at least one additional second tier switch.

3. The method of claim 1, further comprising:
linking the deployed first tier switches to the deployed second tier switches; and
configuring a forwarding table in each deployed first tier switch to distribute flows to the deployed second tier switches based on a number of links between a given first tier switch and at least one of the deployed second tier switches.

4. The method of claim 1, wherein computing the percentage of throughput comprises computing a first percentage for a network performing weighted cost multi-path routing, and a second percentage for a network performing equal cost multi-path routing.

5. The method of claim 1, wherein the second tier switches have a predetermined number of downlink ports, and wherein the proportional number is based on the predetermined number of downlink ports.

6. The method of claim 1, wherein the first tier switches have a predetermined number of uplink ports, and the second tier switches have a predetermined number of downlink ports, and wherein the proportional number is based on the proportion of the uplink ports to the downlink ports.

7. A method of configuring a multi-tier network, comprising:
computing, using a processor, a percentage of throughput associated with deploying a first number of first tier switches and a corresponding number of second tier switches, wherein the first number is within a predetermined range and the computing is performed across the predetermined range;
selecting a threshold throughput based on the computed percentages of throughput associated with deploying the first number of first tier switches and the corresponding number of second tier switches;
calculating, for each number of first tier switches in the predetermined range, a minimum number of second tier switches required to guarantee a throughput at or above the threshold throughput;
determining, based on the computed percentages of throughput and the calculated minimum numbers of required second tier switches, the number of first tier switches and the number of second tier switches to be deployed in the multi-tier network; and
deploying an additional number of second tier switches, wherein the additional number is higher than the calculated minimum required number of second tier switches for the number of first tier switches to be deployed in the network, and lower than the minimum required number of second tier switches for a next higher number of first tier switches.

8. The method of claim 7, wherein determining the number of first tier switches and the number of second tier switches to be deployed is performed by a processor.

9. The method of claim 8, further comprising deploying the determined number of first tier switches and second tier switches in response to the determining.

10. A method of configuring a multi-stage network, comprising:
deploying a first number of first tier switches;
deploying a second number of second tier switches;
linking the first tier switches to the second tier switches; and
programming the first tier switches to distribute flows to the second tier switches using weighted cost multi-path distribution, such that traffic sent by each first tier switch is weighted in relation to a number of links between at least one first tier switch and at least one second tier switch;
wherein the second number of second tier switches is greater than or equal to the first number of first tier switches and provides for a target level of throughput of the flows.

11. The method of claim 10, wherein the first number of first tier switches and the second number of second tier switches are determined by:
computing, using a processor, for each value in a range of values corresponding to a potential number of first tier switches, a percentage of throughput associated with that value and a corresponding number of potential second tier switches;
selecting a threshold throughput;
calculating, for each value in the range of values, a minimum number of second tier switches required to guarantee a throughput at or above the threshold throughput; and
selecting the first number of first tier switches and the second number of second tier switches based on the computed percentages of throughput and the calculated minimum number of required second tier switches.

12. The method of claim 10, wherein programming the first tier switches comprises configuring a forwarding table in each first tier switch to distribute flows to the second tier switches based on a number of links between a given first tier switch and at least one of the deployed second tier switches.

13. A multi-stage network, comprising:
a first number of first tier switches, each of the first tier switches comprising a plurality of uplink ports and being programmed to distribute flows through the uplink ports using weighted cost multi-path distribution such that traffic sent by each first tier switch is weighted in relation to a number of links between at least one first tier switch and at least one second tier switch;
a second number of second tier switches, wherein the second number of second tier switches is greater than or equal to the first number of first tier switches and provides for a target level of throughput of the flows, and wherein the second number of second tier switches further provides for the target level of throughput in the event that at least one second tier switch is not functioning; and
a plurality of links between the first tier switches and the second tier switches, wherein a link is coupled to each of the plurality of uplink ports of each of the first tier switches.

14. The multi-stage network of claim 13, wherein each of the first number of first tier switches further comprises a forwarding table, wherein the forwarding table in each first tier switch is programmed to distribute flows to the second tier switches based on a number of links between a given first tier switch and at least one of the second tier switches.

15. The method of claim 1, wherein the proportional number of second tier switches is one of a multiple of the predetermined number of first tier switches, or a sum of the predetermined number of first tier switches and a given value.

* * * * *